TUNING MEANS FOR HIGH-FREQUENCY DEVICES

Filed Jan. 22, 1944

INVENTOR
ARTHUR E. HARRISON
BY Paul B. Hunter
ATTORNEY

Patented Jan. 3, 1950 2,492,993

UNITED STATES PATENT OFFICE 2,492,993

TUNING MEANS FOR HIGH-FREQUENCY DEVICES

Arthur E. Harrison, Rockville Centre, N. Y., assignor to The Sperry Corporation, a corporation of Delaware Application January 22, 1944, Serial No. 519,294

22 Claims. (Cl. 315—5)

This invention relates to frequency control and is particularly concerned with special frequency control arrangements for hollow resonator apparatus.

Electrically energized frequency control mechanisms for hollow resonator apparatus have previously been proposed. Such mechanisms have, for example, taken the form of suitably connected struts or wires which are electrically heated so as to expand them for varying resonator frequency in one direction and which are permitted to cool and contract for varying resonator frequency in the opposite direction. The operation of such mechanisms is mainly limited by the time lag in cooling and contracting such wires and struts. The time lag involved in heating is smaller and easier to overcome, as by increasing the heating current in the wire or strut. In the present invention, frequency control in opposite directions is independently accomplished and becomes substantially independent of such time lag.

For optimum frequency control of hollow resonator apparatus, it is desirable to locate the operating frequency of the apparatus at about the middle of the tuning range of the frequency control mechanism. In frequency control mechanisms according to the invention employing thermally responsive struts or wires, this result may be obtained by maintaining oppositely and independently acting struts or wires constantly heated so as to maintain a condition of mechanical balance at the the desired operating frequency and so as to render the systems sensitive for speedy frequency variation and control.

It is therefore a major object of the invention to provide novel electrically energized frequency control arrangements for hollow resonator apparatus and the like wherein variations in resonator frequency in opposite directions are selectively independently obtainable.

A further object of the invention is to provide novel hollow resonator frequency control apparatus wherein individually energizable members are provided for independently varying the resonator frequency in opposite directions.

It is a further object of the invention to provide novel hollow resonator frequency control apparatus wherein individual thermally responsive members may be variably heated for positively and independently varying the resonator frequency in opposite directions, and wherein the direction of change of the resonator frequency is substantially independent of the cooling time of said members.

A further object of the invention is to provide novel thermally responsive frequency control arrangements for hollow resonator apparatus wherein wires or struts are independently heated for positively varying the resonator frequency in opposite directions.

It is a further object of the invention to provide novel arrangements for reliably automatically controlling the frequency of hollow resonator apparatus.

A further object of the invention is to provide novel thermally responsive frequency control arrangements for electron discharge apparatus wherein thermally sensitive frequency regulating members arranged within an evacuated envelope are separately energizable for varying the resonator frequency in opposite directions.

A further object of the invention is to provide novel internal structure in an electron discharge device of the hollow resonator type.

A further object of the invention is to provide novel small time constant electrothermal frequency control arrangements for hollow resonator electron discharge devices.

Further objects of the invention will presently appear as the invention proceeds in connection with the appended claims and the annexed drawings wherein:

Figure 1:
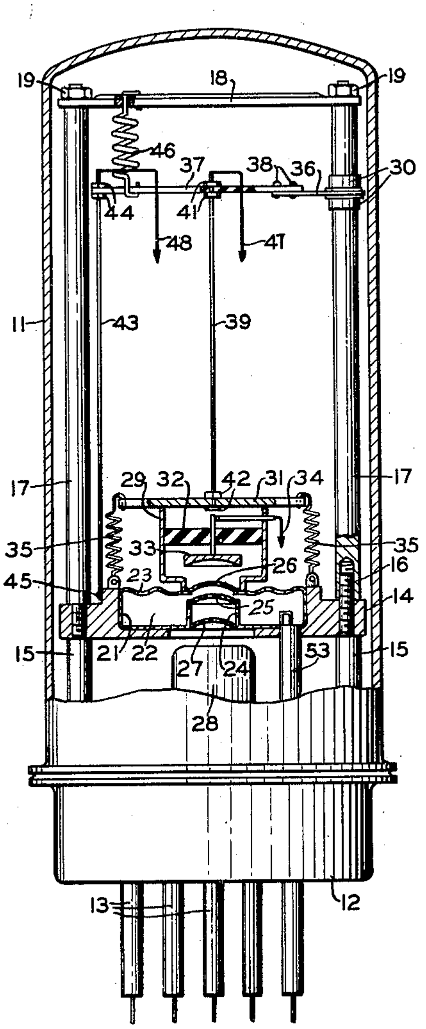
Figure 1 is an elevation partly in section through the axial center of a velocity modulation device embodying bi-directional frequency control arrangements of the invention.

Figure 1 illustrates an electron velocity modulation device wherein the resonator and associated frequency control members are housed within a cylindrical metal envelope 11 sealed in gastight relation to a base 12 of the known vacuum tube type. Base 12 is provided with the usual prongs 13 for connecting elements inside the envelope to external circuits.

A platform 14 disposed normal to the axis of envelope 11 is rigidly supported within the envelope, as by a plurality of posts 15 upstanding from base 12. Each post 15 is formed with a reduced threaded portion 16 extending through a suitable aperture in platform 14 into a tapped bore on the lower end of an elongated post 17. Posts 17 thus function nut-like to hold platform 14 stationary.

The upper ends of posts 17 are rigidly interconnected near the upper end of envelope 11, as by a bridge 18 secured thereto by nuts 19. Bridge 18, posts 17 and 15 and platform 14 form a rigid conductive frame upon which the elements within envelope 11 are supported.

Platform 14 is formed with an upwardly facing shouldered recess 21 in which is seated a hollow cylindrical resonator body 22. Resonator 22 is secured to platform 14, as by soldering to the walls of recess 21.

The upper wall of resonator 22 is flexible, preferably by forming it with an annularly crimped portion 23. The lower wall of resonator 22 is provided with a reentrant hollow pole 24 which supports a wire mesh or like grid 25 adjacent and parallel to a similar grid 26 centrally mounted in a suitable upper end wall aperture. A third similar and parallel grid 27 is mounted across the lower end of pole 24. All three grids are circular and preferably slightly bowed away from the direction of the electron stream axially emitted from a stationary cathode 28, to prevent buckling when heated by the electron stream.

A short hollow cylindrical metal tube 29 coaxial with resonator 22 has its lower end fixed, as by soldering to the upper resonator wall about grid 26. The upper end of tube 29 is similarly secured to a rigid plate 31 disposed normal to the resonator axis. A disc 32 of insulating material is suitably secured within tube 29 for supporting a cup-shaped metal reflector 33 in axial alignment with the electron stream from cathode 28. A suitably insulated lead 34 passes through a suitable aperture in tube 29 to a selected prong 13 for applying a desired electrical potential to reflector 33.

Plate 31 and platform 14 are resiliently interconnected by a plurality of tension springs 35 preferably symmetrically arranged about the resonator axis, for constantly urging grids 25 and 26 toward each other.

Just below bridge 18, a strip 36 of spring metal apertured to encompass a post 17 is anchored to that post 17 by a pair of flanged sleeves 39 secured thereto and to the post. The free end of strip 36 is fixed to a laterally extending rigid lever 37 made of electrical insulation material, as by rivets 38. Strip 36 thereby provides a flexible hinge for enabling lever 37 to swing parallel to the plane of the drawing. Strip 36 is preferably of sufficient rigidity to support lever 37 in the illustrated position normal to the resonator axis, with no load on the lever.

A thin flexible conductor wire or strip 39 is coaxial with resonator 22 and is anchored at opposite ends to an intermediate part of lever 37 and the center of plate 31, as by fastening elements 41 and 42 respectively. A second and similar flexible conductor wire or strip 43 is anchored at its upper end, as by fastening element 44, to the free end of lever 37, and at its lower end, as by fastening element 45, to platform 14.

Conductors 39 and 43 are preferably parallel and taut during operation as will be described. A suitable tension spring 46 is connected between the free end of lever 37 and bridge 18 as illustrated. Spring 46 is stronger than the combined opposed strengths of springs 35 and wall portion 23 as will appear. The lower ends of conductors 39 and 43 are electrically grounded to the frame, and leads 47, 48 respectively are provided for connection of the upper ends of the conductors to selected prongs 13.

Figure 2:
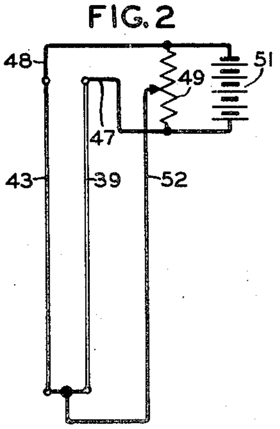
Figure 2 is a wiring diagram of a preferred manner of energizing the frequency control wires or struts of Figure 1.

Figure 2 illustrates a preferred manner of heating conductors 39 and 43 wherein a resistor 49 disposed in parallel with battery 51 has its opposite ends connected to the upper ends of conductors 39 and 43, as by leads 47 and 48 respectively. An adjustable tap 52 connected to resistor 49 intermediate its ends is connected to the grounded tube frame along with the lower ends of conductors 39 and 43, so that conductors 39 and 43 are arranged in substantially a bridge circuit arrangement.

In operation, an axial stream of electrons from cathode 28 is projected through grids 25 and 26, thereby coupling the electron stream with the resonator field existing in the gap between grids 25 and 26, and is returned by charged reflector 33 through exit grid 26 into resonator 22. Grid 27 is preferably suitably energized to serve as an electron acceleration electrode. The electron stream, during the above travel, excites the resonator field and maintains it in oscillation so that the device is an electron stream excited hollow resonator type oscillator serving as a source of ultra high frequency power. High frequency energy may be extracted from resonator 22, as by the coaxial line and antenna assembly 53.

Theories of operation of the oscillator based on velocity modulation principles are explained in United States Letters Patent No. 2,250,511 to which reference is made for further detail.

Flexible wall portion 23 of resonator 22 permits relative displacement of grids 25 and 26 toward and away from each other to thereby effectively change the circuit characteristics of the resonator and change the resonator shape and volume so as to vary the natural frequency of the resonator.

When flexible conductor 39 is heated, as by passage of electric current therealong, it expands in length, permitting springs 35 which are sufficiently strong to flex resonator wall portion 23 to displace grid 26 toward grid 25 and thereby decrease the natural frequency of resonator 22. During this operation the upper end of conductor 39 is held substantially stationary since spring 46 is stronger than the combined strengths of springs 35.

When flexible conductor 43 is heated, as by passage of electric current therealong, it expands in length, permitting spring 46 to swing lever 37 clockwise about spring hinge 36. Spring 46 is strong enough to overcome springs 35 and the resistance of flexible wall portion 23, and hence acts through a motion transmitting connection comprising conductor 39, plate 31 and tube 29 to displace grid 26 away from grid 25 and thereby increase the natural frequency of resonator 22.

The resonator frequency may therefore be varied in opposite directions, or held at a desired operating point, depending on the relative energization of conductors 39 and 43.

If desired, conductors 39 and 43 may be rigid conductor struts or rods, in which event the biasing springs 35 and 46 may be eliminated. Operation of frequency varying mechanism using conductor struts is otherwise the same as above explained.

When energized by the bridge circuit arrangement of Figure 2, the relative temperatures of conductors 39 and 43 are selected by manual adjustment of tap 52. Normally, tap 52 is located near the middle of resistor 49 so that conductors 39 and 43 are both equally heated and the frequency control mechanism within envelope 11 is in such mechanical balance as to maintain the resonator grid spacing corresponding to a selected resonator operating frequency.

Adjustment of tap 52 from the mechanical balance position will immediately vary the current in both conductors, increasing energization of one and decreasing energization of the other. For example, if tap 52 is moved upwardly in Figure 2, conductor 39 will be increasingly energized and the current along conductor 43 will be decreased.

Conductor 39, when energized, heats with a relatively small time lag and is therefore speedily sensitive to its increased energization to expand and permit decrease in the resonator frequency. The small time lag present in heating the conductor may be even further reduced by applying a larger amount of power to the conductor. Of course, the cooling and shortening conductor 43 likewise tends to decrease the resonator frequency but the cooling process involves an appreciable time lag which is difficult to overcome. The positive frequency-changing action of conductor 39 effects decrease in the resonator frequency far more speedily than the same could be accomplished simply by cooling of conductor 43. Where conductor 43 is a thin wire or other quickly cooling member, the frequency decreasing actions of conductors 39 and 43 may even be partly concomitant and additive thereby further speeding frequency control in that direction.

Should tap 52 be moved in the opposite direction, the reverse operation takes place to increase the resonator frequency.

The frequency control mechanism of Figure 1 is especially adaptable for automatic frequency control systems wherein signals corresponding to variations from a desired frequency condition are employed to change the frequency of resonator 22 to restore the frequency condition.

Figure 3:
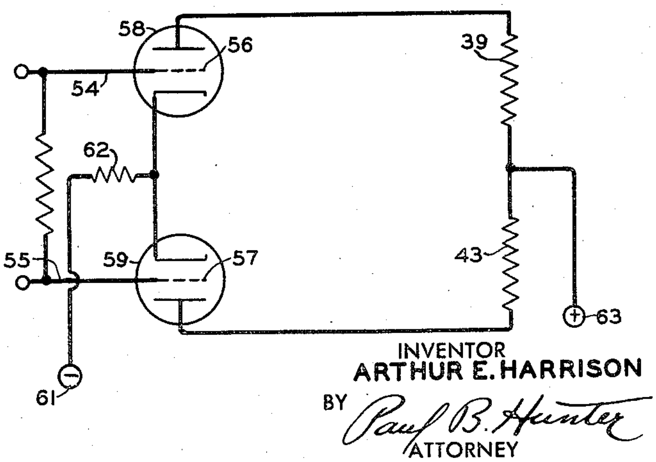
Figure 3 is a schematic and wiring diagram illustrating an automatic frequency control application of the invention.

Such an automatic frequency control arrangement is illustrated in Figure 3, wherein an input control voltage is introduced on leads 54 and 55 from a conventional frequency or phase discriminator or the like having an output voltage whose polarity and amplitude depend on departure from a given frequency condition in a system to be controlled. For example, the input control voltage could be that derived from the discriminator of the automatic frequency control system disclosed in United States Letters Patent No. 2,294,942, and the illustrated hollow resonator device of Figure 1 herein could be the oscillator whose frequency is to be controlled in the systems of said Patent No. 2,294,942.

Input leads 54, 55 are connected respectively to control grids 56, 57 of amplifier triodes 58, 59 which have their cathodes connected together and to the negative current supply terminal 61 through a common cathode resistor 62. Conductor 39 serves as the plate load resistor for amplifier 58, while conductor 43 serves as the plate load resistor for amplifier 59, each of these conductors being connected to the positive plate current supply as at 63.

In operation, amplifiers 58 and 59 may be class B amplifiers and so normally biased as to be non-conductive when no signal appears on leads 54 and 55, a condition existing when there is no output from the discriminator and the system is in balance. Assume that when the resonator frequency to be controlled increases from a desired value such that, through the automatic frequency control systems, there is produced a positive discriminator output voltage on lead 54. Amplifier 58 is thereby rendered conductive while amplifier 59 remains non-conductive, so that conductor wire 39 is heated to cause decrease in the resonator frequency. Similarly, when a positive discriminator output appears on lead 55, due to a decrease in resonator frequency from the desired value, wire 43 is heated to cause an increase in resonator frequency. This action may continue until the desired resonator frequency is attained.

If desired, amplifiers 58, 59 may be biased to operate class A, in which case wires 39 and 43 would be always heated as with the circuit of Figure 2 and would oppositely vary in temperature upon a variation in the frequency to be controlled. This class A operation would produce shorter time constant additive frequency control motion, which would be somewhat faster than class B operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electron discharge device comprising means for producing an electron stream, a hollow resonator positioned along the path of said stream and coupled thereto in energy interchanging relation, said resonator having two relatively movable means for varying the natural frequency thereof, said resonator, and a pair of longitudinally extensible means mutually independently actuatable and extensible substantially only linearly, said pair of extensible means being each connected respectively to said movable means for substantially independently and oppositely varying the magnitude of the natural frequency of said resonator.

2. High frequency apparatus comprising a hollow resonator, relatively movable tuning means in said apparatus shiftably connected to said hollow resonator for varying the frequency of said resonator, a first thermally sensitive longitudinal extensible means expansible substantially only linearly and connected to said tuning means for varying the magnitude of the resonator frequency in a given direction and a second thermally sensitive longitudinally extensible means expansible substantially only linearly and connected to said tuning means for varying the magnitude of the resonator frequency in a direction opposite to said given direction.

3. The apparatus defined in claim 2, wherein said first and said second thermally sensitive means each comprises an expansible conductor element adapted to expand linearly in response to current flow therethrough.

4. High frequency apparatus comprising an envelope, a hollow resonator device within said envelope, relatively movable tuning means carried by said device for varying the frequency of said resonator, and frequency control means within said envelope including a first thermally sensitive element expansible substantially only linearly and connected at one end to said tuning means for effecting variations of the magnitude of the said resonator frequency in a given direction and a second thermally sensitive element expansible only linearly and connected at one end to said tuning means for effecting variations of the magnitude of said resonator frequency in the opposite direction, the other end of said elements being connected to an insulating mounting means.

5. The apparatus defined in claim 4, wherein said frequency control means further includes means for conjointly actuating said first and said second thermally sensitive expansible elements.

6. The apparatus defined in claim 4, wherein said frequency control means further includes means for selectively and separately actuating said linearly expansible elements.

7. Means for controlling the frequency of hollow resonator apparatus comprising a pair of mutually spaced relatively movable members carried by said apparatus so that relative movement between said members effects variation in the resonator frequency, a pair of thermally actuated longitudinally expansible means, each having an end connected to said movable members for effecting relative movement of said relatively movable members in one sense by longitudinal expansion of one of said expansible means and for effecting relative movement of said relatively movable members in the opposite sense by similar longitudinal expansion of the other of said expansible means, the other ends of said expansible means being connected to an insulating mounting means for selectively controlling the longitudinal extension of said expansible means.

8. High frequency apparatus comprising a resonator having a pair of relatively movable members for tuning said resonator; first deformable means including a first thermally sensitive longitudinally expansible member deformable in a given direction and connected to said relatively movable members for effecting by its deformation relative movement of said relatively movable members in one sense; and second deformable means including a second thermally sensitive longitudinally expansible member deformable in the said direction and connected to said relatively movable members for effecting relative movement of said relatively movable members in the opposite sense upon its deformation in the said direction.

9. Apparatus as in claim 8 further including means for individually actuating said first and second deformable means.

10. High frequency electron discharge apparatus comprising a resonator having a pair of relatively movable members and also having a pair of aligned electron-permeable walls, said members being movable substantially in a given direction; a cathode aligned with said electron-permeable walls; first longitudinally expansible means expansible in said direction and connected to said relatively movable members for effecting relative movement of said relatively movable members in one sense by its expansion in said given direction; and second longitudinally expansible means similar to said first expansible means and expansible in the same direction, said second expansible means being connected to said relatively movable members for effecting relative movement of said relatively movable members in the opposite sense by its expansion in the said direction.

11. Apparatus as in claim 10 further including means for conjointly actuating said first and second expansible means.

12. Ultra-high-frequency apparatus comprising a resonator having a pair of relatively movable wall portions, a linearly expansible member having one end connected to one of said relatively movable wall portions for effecting relative movement of said relatively movable wall portions in one sense by its linear expansion and a second linearly expansible member having one end connected to one of said relatively movable wall portions for effecting relative movement of said relatively movable wall portions in the opposite sense by its linear expansion, the other ends of said members being connected to an insulating mounting means.

13. An ultra-high-frequency electron-discharge device comprising a resonator having a pair of aligned electron-permeable portions and including a pair of relatively movable members for varying the frequency of said resonator, a source of electrons aligned with said electron-permeable portions, a first longitudinally expansive member adapted to elongate in response to current flow therethrough and connected to said relatively movable members for effecting by its expansion a decrease in the frequency of said resonator, and a second longitudinally expansible member adapted to elongate in response to current therethrough and connected to said movable members for effecting by its expansion an increase in the frequency of said resonator.

14. High frequency apparatus comprising a hollow resonator having two wall portions which are relatively movable for varying the frequency of said resonator, a pair of elongated thermally sensitive longitudinal expansible members and means connecting one end of each of said members to said wall portions respectively for relative motion of said wall portions in a direction substantially parallel to the length of said members in response to longitudinal extension of said members, the other ends of said members being connected to an insulating mounting means, said members being selectively energizable for relatively moving said wall portions for independently varying the magnitude of the resonator frequency in opposite directions.

15. High frequency apparatus comprising a resonator including a flexible wall for varying the natural frequency of said resonator and also including an opposing rigid wall, a first elongated longitudinal expansible member, means connecting said flexible wall to said first elongated member for flexing said flexible wall toward said rigid wall and in a direction substantially parallel to the length of said first elongated member in response to longitudinal expansion of said first elongated member, a second elongated longitudinal expansible member, means connecting said second elongated member to said flexible wall for flexing said flexible wall away from said rigid wall and in a direction substantially parallel to the length of said second elongated member in response to longitudinal expansion of said second elongated member, and means connecting said first and second members to an insulating mounting means.

16. High frequency apparatus comprising a hollow resonator having a pair of wall portions which are relatively movable for varying the frequency of said resonator, spaced members rigid with said respective wall portions, an insulating body flexibly connected to one of said members, a pair of thermally sensitive longitudinally extensible conductors having corresponding ends anchored to said body in spaced relation and electrically insulated from each other, and means connecting the other end of each of said conductors to another one of said members, whereby extension of said conductors effects relative movement of said wall portions.

17. High frequency apparatus comprising a hollow resonator device having two wall portions which are relatively movable for varying the frequency of said resonator, two separately acting thermally sensitive longitudinally extensible members in said apparatus each having one end connected to one of said wall portions, and means for anchoring the other ends of said extensible members in electrically insulated relation in said apparatus.

18. High frequency apparatus comprising a support, a hollow resonator mounted on said support, said resonator having a wall portion movable relative to said support for varying the resonator frequency, resilient lever means connected to said support, a thermally sensitive longitudinally expansible and contractible member connected to said resilient lever means and to said wall portion, and a second thermally sensitive longitudinally expansible and contractible member connected to said resilient lever means and to said support.

19. High frequency apparatus comprising a supporting means, a hollow resonator on said supporting means, said resonator having a resilient wall portion for varying the natural frequency of said resonator, a lever hinged to said supporting means in spaced relation to said resonator, a flexible longitudinally expansible member of adjustable length connected between said lever and said wall portion, a second flexible longitudinally expansible member of adjustable length connected between said lever and said supporting means, and means on said supporting means for maintaining said flexible members substantially taut.

20. The apparatus defined in claim 19, wherein said resilient last-named means comprises separate means for individually tautening said flexible members.

21. Electron discharge apparatus comprising means for producing an electron stream, a hollow resonator positioned along the path of said stream and in energy exchanging coupling therewith, said resonator having a deformable wall for varying the natural frequency of said resonator, an envelope providing a vacuumtight enclosure for said resonator and electron stream, a pair of thermally sensitive longitudinally expansible and contractible electrical conductors within said envelope for selectively varying the deformation of said deformable wall, means interconnecting said deformable wall and said conductors, whereby said deformable wall is deformed in accordance with changes in length of said conductors, and means providing electrical energization of the respective conductors.

22. An electron discharge device comprising a hollow resonator having relatively movable electron permeable wall portions mounted in alignment to permit passage of an electron stream through the resonator field in the gap between said portions, a mounting member resiliently connected to one of said wall portions, two thermally sensitive expansible and contractible flexible conductors having corresponding ends secured in electrically insulated relation to said mounting member, and means securing the other ends of said flexible conductors to said respective wall portions.

ARTHUR E. HARRISON.

REFERENCES CITED

The following references are of record in the file of this patent:

UNITED STATES PATENTS

| Number | Name | Date |
|---|---|---|
| 1,913,978 | Ewen | June 13, 1933 |
| 2,280,527 | Kimball | Apr. 21, 1942 |
| 2,337,214 | Tunick | Dec. 21, 1943 |
| 2,408,817 | Snow | Oct. 8, 1946 |
| 2,414,496 | Varian et al. | Jan. 21, 1947 |
| 2,414,785 | Harrison et al. | Jan. 21, 1947 |

FOREIGN PATENTS

| Number | Country | Date |
|---|---|---|
| 537,518 | Great Britain | June 25, 1941 |